(12) United States Patent
Hirooka

(10) Patent No.: US 10,119,517 B2
(45) Date of Patent: Nov. 6, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Hisato Hirooka, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 15/638,481

(22) Filed: Jun. 30, 2017

(65) Prior Publication Data

US 2018/0010567 A1    Jan. 11, 2018

(30) Foreign Application Priority Data

Jul. 5, 2016 (JP) .................................. 2016-133533

(51) Int. Cl.
| | |
|---|---|
| *F02B 17/00* | (2006.01) |
| *F02P 15/00* | (2006.01) |
| *F02D 41/06* | (2006.01) |
| *F02D 41/34* | (2006.01) |
| *F02D 43/00* | (2006.01) |
| *F02N 19/00* | (2010.01) |
| *F02P 5/153* | (2006.01) |

(Continued)

(52) U.S. Cl.
CPC .......... *F02P 15/006* (2013.01); *F02D 35/028* (2013.01); *F02D 41/0255* (2013.01); *F02D 41/061* (2013.01); *F02D 41/345* (2013.01); *F02D 41/405* (2013.01); *F02D 43/00* (2013.01); *F02N 19/005* (2013.01); *F02P 5/153* (2013.01);

(Continued)

(58) Field of Classification Search
CPC .... F02B 7/00; F02B 2075/125; F02B 23/101; F02B 23/105; F02D 2041/389; F02D 19/081; F02D 41/0025; F02D 35/023; F02D 35/025; F02M 61/1813
USPC ....... 123/294, 295, 298, 301, 304, 305, 434, 123/435
See application file for complete search history.

(56) References Cited

U.S. PATENT DOCUMENTS

| | | |
|---|---|---|
| 2008/0196696 A1 | 8/2008 | Storhok et al. |
| 2013/0160739 A1* | 6/2013 | Suzuki .................. F02P 5/1502 123/406.29 |

(Continued)

FOREIGN PATENT DOCUMENTS

| | | |
|---|---|---|
| JP | 2004036461 A | 2/2004 |
| JP | 2006-052687 A | 2/2006 |

(Continued)

*Primary Examiner* — John Kwon
(74) *Attorney, Agent, or Firm* — Hunton Andrews Kurth LLP

(57) ABSTRACT

A control device for an internal combustion engine is programmed, during a catalyst warm-up control, to perform first fuel injection by an injector in an intake stroke, control an ignition device so as to generate a discharge spark in a predetermined period in an expansion stroke, and perform second fuel injection, at a timing retarded from a compression top dead center, such that its injection period overlaps with at least a part of the predetermined period and an end timing of the injection period is advanced from an end timing of the predetermined period. Further, the control device is programmed, during the catalyst warm-up control, to control an actual tumble ratio depending on a result of determination using a first index value representing a speed of initial combustion accompanying an ignition by the ignition device and a second index value representing a speed of main combustion accompanying the ignition.

4 Claims, 9 Drawing Sheets

(51) Int. Cl.
- *F02D 41/02* (2006.01)
- *F02D 41/40* (2006.01)
- *F02D 35/02* (2006.01)
- *F02D 37/02* (2006.01)
- *F02N 11/08* (2006.01)
- *F02D 41/00* (2006.01)

(52) U.S. Cl.
CPC .......... *F02P 15/003* (2013.01); *F02D 35/023* (2013.01); *F02D 37/02* (2013.01); *F02D 2041/0015* (2013.01); *F02N 11/0814* (2013.01); *F02N 2200/021* (2013.01)

(56) References Cited

U.S. PATENT DOCUMENTS

| | | | |
|---|---|---|---|
| 2013/0282256 A1* | 10/2013 | Watanuki | F02D 23/02 701/102 |
| 2016/0115880 A1 | 4/2016 | Kondo et al. | |
| 2016/0195027 A1 | 7/2016 | Mori et al. | |
| 2016/0258345 A1* | 9/2016 | Kimura | F02D 41/402 |
| 2016/0290307 A1 | 10/2016 | Urano et al. | |
| 2016/0298586 A1* | 10/2016 | Kimura | F02M 59/22 |
| 2017/0101949 A1* | 4/2017 | Yokono | F02D 41/0002 |

FOREIGN PATENT DOCUMENTS

| | | |
|---|---|---|
| JP | 2006250050 A | 9/2006 |
| JP | 2007-278257 A | 10/2007 |
| JP | 2009-024627 A | 2/2009 |
| JP | 2014-145306 A | 8/2014 |
| JP | 2015-052290 A | 3/2015 |
| JP | 2015098799 A | 5/2015 |
| JP | 2015169170 A | 9/2015 |

\* cited by examiner

CONTROL DEVICE FOR INTERNAL COMBUSTION ENGINE

CROSS-REFERENCE TO RELATED APPLICATION

This application is based on and claims the benefit of Japanese Patent Application No. 2016-133533, filed on Jul. 5, 2016, which is incorporated by reference herein in its entirety.

BACKGROUND

Technical Field

The present disclosure relates to a control device for an internal combustion engine and, more particularly, to a control device for controlling an internal combustion engine that includes an injector and a spark plug arranged in an upper part of a combustion chamber, and a catalyst (an exhaust gas purification catalyst) for purifying exhaust gas from the combustion chamber.

Background Art

For an internal combustion engine including an injector and a spark plug in an upper part of a combustion chamber, control techniques have been proposed to promote activation of an exhaust gas purification catalyst in the process of warming-up of an internal combustion engine. For example, JP 2006-052687 A discloses a control device for an internal combustion engine including an injector that is provided in an upper part of a combustion chamber and directly injects fuel into a cylinder, a spark plug for igniting an air-fuel mixture in the combustion chamber and is provided at a location at which a part of a fuel spray from the injector directly reaches in the upper part of the combustion chamber, and an exhaust gas purification catalyst provided in an exhaust channel. The control device performs an injection by the injector and an ignition by the spark plug in an expansion stroke for the purpose of promoting activation of the exhaust gas purification catalyst.

In the control device described above, the injection and the ignition in the expansion stroke are performed in such a manner as to be added to an injection and an ignition that are performed in an intake stroke or a compression stroke. Specifically, the first-time injection is performed in the intake stroke or the compression stroke, and thereafter, the first-time ignition is performed. Subsequently, in the middle stage to the latter stage of the expansion stroke, the second-time injection with an objective of activation of the exhaust gas purification catalyst is performed, and thereafter, the second-time ignition is performed. The amount of the second-time fuel injection is less as compared with the amount of the first-time fuel injection, and the second-time ignition is performed before a fuel spray by the second-time injection reaches the wall surface of the combustion chamber. According to the control device, since the positional relationship of the injector and the spark plug is as described above, and the second-time ignition is performed at the timing described above, most of fuel by the second-time injection is burned and an exhaust gas temperature can be increased.

Further, JP 2015-052290 A discloses a control device for an internal combustion engine in which a tumble flow is generated in a cylinder at the time of a lean burn operation. According to this control device, by controlling a tumble ratio (which is a ratio of flow velocity of the tumble flow divided by engine speed), the shape of the tumble flow is switched between a normal tumble shape and a ω tumble shape. The tumble flow in the normal tumble shape mentioned here refers to a tumble flow in the shape in which the flow direction of in-cylinder gas around the spark plug disposed in the vicinity of the center of the upper part of the combustion chamber remains to be a direction from an intake valve side to an exhaust valve side even in the latter half of the compression stroke. Further, the tumble flow in the ω tumble shape (also simply referred to as the "ω tumble flow") refers to a tumble flow in a shape in which the flow direction of the in-cylinder gas around the spark plug is inverted to the direction to the intake valve side from the exhaust valve side, from the direction to the exhaust valve side from the intake valve side in the latter half of the compression stroke. More specifically, according to the control device, when the ω tumble flow is needed, an actual tumble ratio is controlled so that the tumble ratio within a tumble ratio range suitable for generation of the ω tumble flow is obtained. The actual tumble ratio is controlled by using an actuator, such as a tumble control valve.

In addition to JP 2006-052687 A and JP 2015-052290 A, JP 2009-024627 A and JP 2014-145306 A are patent documents which may be related to the present disclosure.

SUMMARY

The present inventor has been studying control for activating an exhaust gas purification catalyst in an internal combustion engine having a configuration that is different from the configuration in JP 2006-052687 A. The engine configuration according the study is common to the engine configuration of the publication in the feature in which the injector and the spark plug are both provided in the upper part of the combustion chamber, the feature in which the injector is disposed on the intake valve side of the spark plug, and the feature in which the injector has a fuel spray going toward the spark plug. However, the engine configuration relating to the study differs from the engine configuration of the publication in a feature in which one or more injection holes are oriented such that the contour surface of a fuel spray going from the one or more injection holes toward the spark plug passes under the electrode portion of the spark plug. Further, the engine configuration relating to the study also differs from the engine configuration of the publication in a feature in which a tumble flow is generated by intake air that is supplied to the combustion chamber.

The tumble flow that is generated in the combustion chamber flows in the combustion chamber so as to go to an exhaust valve side from an intake valve side in the upper part of the combustion chamber, and the control relating to the study is based on the tumble flow like this. In detail, according to the control relating to the study, the injector is controlled such that a first fuel injection is performed at a timing advanced from the compression top dead center, and a start timing of an ignition by the spark plug (that is, a start timing of discharge at the electrode portion described above) is set on the retard side of the compression top dead center (that is, during the expansion stroke). In addition to the above, according to the control relating to the study, a second fuel injection is performed in such a manner that the injection period ends during a period of discharge at the electrode portion (a spark period). The fuel that is injected in a high-pressure state from the injector takes away air around the fuel and thereby forms a low-pressure portion (entrainment). Consequently, when the second fuel injection is performed in such a manner that the injection period ends during the discharge period, an initial flame that is generated as a result of igniting a fuel spray by the first fuel injection in the expansion stroke is attracted to the low-pressure portion which is formed around the fuel spray by the second fuel injection that goes toward the spark plug.

When the second-time injection in the middle stage to the latter stage of the expansion stroke and the subsequent second-time ignition as in JP 2006-052687 A are performed in the combustion chamber in which a tumble flow is generated, the shape of the fuel spray by the second-time injection easily changes due to the influences of the tumble flow and in-cylinder pressure in a period until the second-time ignition is started. Consequently, unless the position of the injector is determined with plug smoldering of the spark plug taken into consideration or unless an optimal injection timing of the injector is selected, the concentration of an air-fuel mixture around the spark plug may not be stabilized and combustion fluctuation may increase. In this respect, if the second fuel injection is performed in such a manner that the injection period ends during the spark period, the initial flame that is attracted to the above described low-pressure portion comes in contact with the fuel spray by the second fuel injection, and grows by entraining the fuel spray. Thereby, the combustion speed of the air-fuel mixture is enhanced to stabilize combustion, and the combustion fluctuation is reduced.

Furthermore, as a result of the earnest study of the present inventor, it has been found out that, by using the aforementioned ω tumble flow during execution of the control relating to the study, the time period from generation of the initial flame until the initial flame reaches the fuel spray by the second fuel injection can be reduced, and the combustion stability can be enhanced more effectively during the execution of the control relating to the study. However, the aforementioned tumble ratio range suitable for generation of a ω tumble flow is narrow, and the tumble ratio may vary due to the factor such as a manufacturing error or aged deterioration of the internal combustion engine. Accordingly, in order to enhance the combustion stability during the execution of the control relating to the study, it is desirable to stably make a ω tumble flow usable.

The present disclosure has been made in the light of the problem as described above, and an object of the present disclosure is to enable a ω tumble flow to be used stably at the time of performing control for activation of an exhaust gas purification catalyst in an internal combustion engine having a configuration in which one or more injection holes of an injector are oriented such that the contour surface of a fuel spray that is injected from the one or more injection holes toward a spark plug passes under an electrode portion of the spark plug.

A control device for an internal combustion engine according to the present disclosure is configured to control an internal combustion engine that includes: an ignition device arranged in a vicinity of a center of an upper part of a combustion chamber, and includes a spark plug for igniting an air-fuel mixture in a cylinder using a discharge spark; an injector arranged nearer to an intake valve than the spark plug in the vicinity of the center of the upper part of the combustion chamber, and includes one or more injection holes provided such that a contour surface of a fuel spray injected from the one or more injection holes toward the spark plug passes under an electrode portion of the spark plug; an in-cylinder pressure sensor configured to detect in-cylinder pressure; and an exhaust gas purification catalyst configured to purify exhaust gas from the combustion chamber. A tumble flow that flows so as to go toward a side of an exhaust valve from a side of the intake valve in the upper part of the combustion chamber is generated in the combustion chamber of the internal combustion engine. The control device includes a tumble flow control section programmed to control a predetermined actuator such that a flow velocity of the tumble flow changes; a combustion control section programmed, in order to activate the exhaust gas purification catalyst, to control the injector so as to perform first fuel injection at a timing advanced from a compression top dead center, control the ignition device so as to generate the discharge spark in a predetermined period that is located in an expansion stroke, and control the injector so as to perform second fuel injection at a timing retarded from the compression top dead center, the second fuel injection being performed such that an injection period overlaps with at least a part of the predetermined period and an end timing of the injection period is advanced from an end timing of the predetermined period; and a parameter calculation section programmed, based on output values of the in-cylinder pressure sensor, to calculate a first index value representing a speed of initial combustion accompanying an ignition by the ignition device controlled by the combustion control section and a second index value representing a speed of main combustion accompanying the ignition. The tumble flow control section is programmed to execute at least one of a tumble ratio decrease control and a tumble ratio increase control, the tumble ratio decrease control decreasing an actual tumble ratio by decreasing the flow velocity of the tumble flow when the first index value indicates that the speed of the initial combustion is lower than a first threshold value and the second index value indicates that the speed of the main combustion is a second threshold value or more, the tumble ratio increase control increasing the actual tumble ratio by increasing the flow velocity of the tumble flow when the first index value indicates that the speed of the initial combustion is lower than the first threshold value and the second index value indicates that the speed of the main combustion is lower than the second threshold value.

The first index value may be a crank angle period from a start timing of the predetermined period to a specified fraction combustion point that is a crank angle at which a mass fraction of burned fuel based on an output value of the in-cylinder pressure sensor reaches a specified fraction that is less than 50%.

The specified fraction combustion point may be a 10% combustion point that is a crank angle at which the mass fraction of burned fuel based on an output value of the in-cylinder pressure sensor reaches 10%.

The second index value may be a crank angle period from a 10% combustion point to a 50% combustion point, the 10% combustion point being a crank angle at which a mass fraction of burned fuel based on an output value of the in-cylinder pressure sensor reaches 10%, the 50% combustion point being a crank angle at which the mass fraction of burned fuel based on an output value of the in-cylinder sensor reaches 50%.

According to the control device for an internal combustion engine of the present disclosure, when control for activating the exhaust gas purification catalyst is performed, at least one of the tumble ratio decrease control and the tumble ratio increase control is performed. The tumble ratio decrease control decreases the actual tumble ratio by decreasing the flow velocity of the tumble flow when the first index value indicates that the speed of the initial combustion is lower than the first threshold value and the second index value indicates that the speed of the main combustion is the second threshold value or more. The tumble ratio increase control increases the actual tumble ratio by increasing the flow velocity of the tumble flow when the first index value indicates that the speed of the initial combustion is lower than the first threshold value and the second index value indicates that the speed of the main combustion is lower than the second threshold value. Thereby, the ω tumble flow can be used stably.

DETAILED DESCRIPTION

First Embodiment

Figure 1:
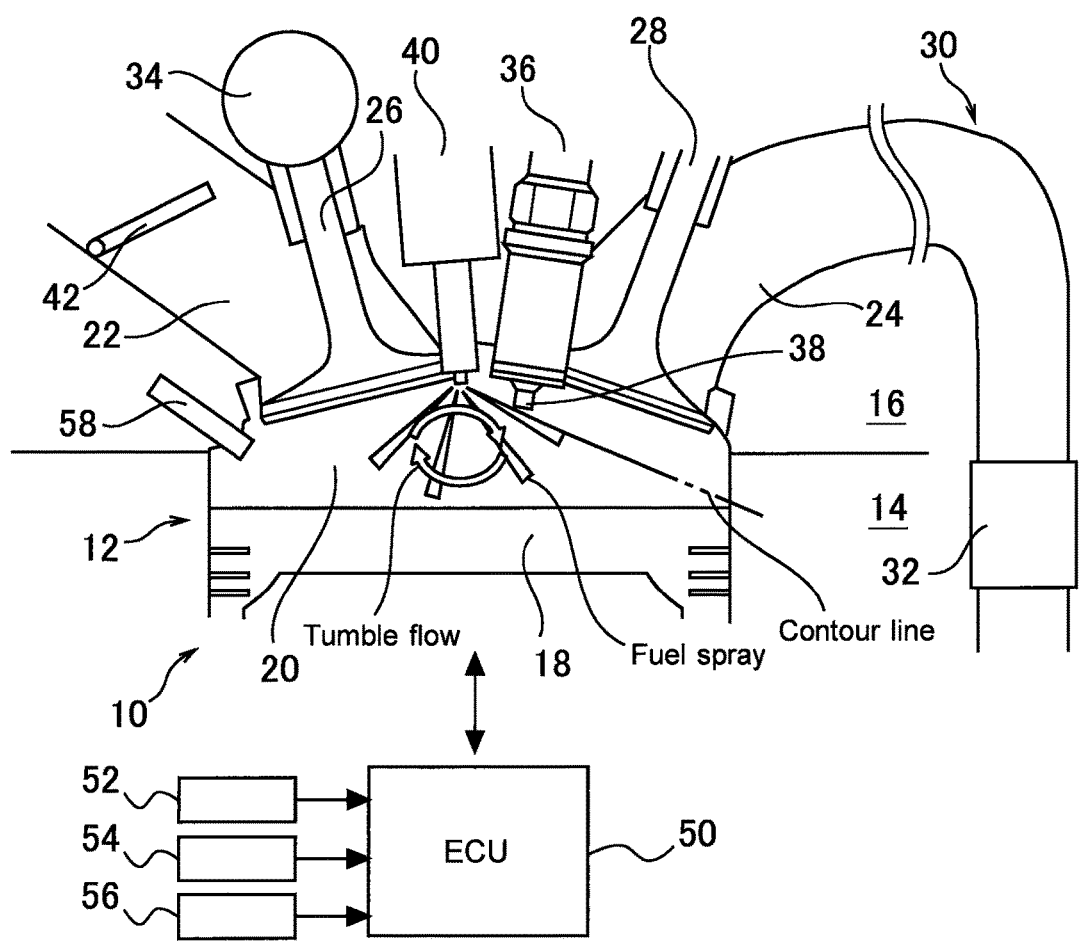
FIG. 1 is a diagram for explaining a system configuration according to a first embodiment of the present disclosure.

At first, with reference to FIGS. 1 to 11, a first embodiment according to the present disclosure will be described.
[Explanation of System Configuration]
FIG. 1 is a diagram for explaining a system configuration according to the first embodiment of the present disclosure. As illustrated in FIG. 1, the system according to the present embodiment includes an internal combustion engine 10 that is installed on a vehicle. The internal combustion engine 10 is a four-stroke one-cycle engine, and has a plurality of cylinders. However, FIG. 1 illustrates only one cylinder 12 among them. The internal combustion engine 10 includes a cylinder block 14 in which the cylinder 12 is formed, and a cylinder head 16 that is disposed on the cylinder block 14. In the cylinder 12, a piston 18 that reciprocates in an axial direction of the cylinder 12 is disposed. In an example of the present embodiment, the axial direction is a vertical direction. A combustion chamber 20 of the internal combustion engine 10 is defined by at least a wall surface of the cylinder block 14, an undersurface of the cylinder head 16, and the top surface of the piston 18.

In the cylinder head 16, two intake ports 22 and two exhaust ports 24 that communicate with the combustion chamber 20 are formed as an example. An intake valve 26 is provided in an opening portion of the intake port 22 which communicates with the combustion chamber 20. An exhaust valve 28 is provided in an opening portion of the exhaust port 24 which communicates with the combustion chamber 20. An exhaust channel 30 of the internal combustion engine 10 includes a channel in the exhaust port 24. In a location of the exhaust channel 30 on the downstream side of the exhaust port 24, an exhaust gas purification catalyst 32 is disposed. As an example of the exhaust gas purification catalyst 32, a three-way catalyst is installed to purify nitrogen oxides (NOx), hydrocarbons (HC), and carbon monoxide (CO) in the exhaust gas when the atmosphere of the catalyst in an activated state is near the stoichiometry.

A variable intake valve apparatus 34 is configured to change the valve opening characteristics of the intake valve 26. More specifically, the variable intake valve apparatus 34 has a variable valve timing (VVT) device that continuously changes an opening and closing timings within a predetermined range while a valve opening period (an operating angle) of the intake valve 26 is fixed, as one example. The VVT device that is used in the present embodiment collectively changes the opening and closing timings of the intake valves 26 of a plurality of cylinders (for example, all cylinders in the present embodiment) that share an intake camshaft (not illustrated), as one example.

In the cylinder head 16, a spark plug 36 is provided at a position which is slightly nearer to the exhaust valve 28 than the center of an upper part of the combustion chamber 20. A tip end of the spark plug 36 includes an electrode portion 38 having a center electrode and a ground electrode. Further, in a position that is in the vicinity of the center of the upper part of the combustion chamber 20 and is nearer to the intake valve 26 than a position where the spark plug 36 is provided, an injector 40 is provided in such a manner that its tip end is protruded into the combustion chamber 20. The injector 40 is connected to a fuel supply system (not illustrated) that includes a fuel tank, a delivery pipe and a supply pump. At the tip end of the injector 40, a plurality of injection holes (not illustrated) are formed radially, and when a valve of the injector 40 is opened, fuel in a high-pressure state is injected from these injection holes. In the injector 40, the orientations of the injection holes are set in advance such that the contour surface (hereinafter, also referred to as a "spray contour surface") of a fuel spray (injected from one or more injection holes) that is closest to the spark plug 36 among fuel sprays injected radially from the injection holes passes under the electrode portion 38 of the spark plug 36. The contour line drawn in FIG. 1 represents the contour surface of the fuel spray that is closest to the spark plug 36 among the fuel sprays injected from the injector 40.

An electronically controlled type tumble control valve (TCV) 42 is provided at the intake port 22 of each of the cylinders. The TCV 42 generates a tumble flow (vertical vortex flow) in the cylinder by generating a biased flow of intake air in the intake port 22. By changing an opening degree of the TCV 42, a tumble ratio (which is a ratio of angular velocity of tumble flow divided by engine speed) of the tumble flow can be controlled. More specifically, in the internal combustion engine 10, as illustrated in FIG. 1, generating the tumble flow in the following mode is a precondition and control of a shape of the tumble flow will be described later. That is, the tumble flow flows in the combustion chamber 20 to go toward the exhaust valve 28 side from the intake valve 26 side in the upper part in the combustion chamber 20. In the present specification, the tumble flow in this kind of shape is also referred to as a "positive tumble flow". Generation of the positive tumble flow may be realized by devising the shape of the intake port 22 with a known knowledge instead of using the TCV 42.

Further, as illustrated in FIG. 1, the system according to the present embodiment includes an electronic control unit (ECU) 50. The ECU 50 includes at least a RAM (Random Access Memory), a ROM (Read Only Memory) and a CPU (Central Processing Unit). The ECU 50 receives and processes signals of various sensors installed in the vehicle. The various sensors include at least a crank angle sensor 52 that detects a rotation angle of a crankshaft connected to the piston 18, an accelerator position sensor 54 that detects a depression amount of an accelerator pedal by a driver of the vehicle, a temperature sensor 56 that detects a cooling water temperature (hereinafter, also referred to as an "engine cooling water temperature") of the internal combustion engine 10, and an in-cylinder pressure sensor 58 that detects an in-cylinder pressure. The ECU 50 processes the signals of the respective sensors that are received and operates various actuators in accordance with predetermined control programs. The actuators that are operated by the ECU 50 include at least the injector 40 and an ignition device (components other than the spark plug 36 are not illustrated).

[Calculation of MFB and CAX based on MFB]

Figure 2:
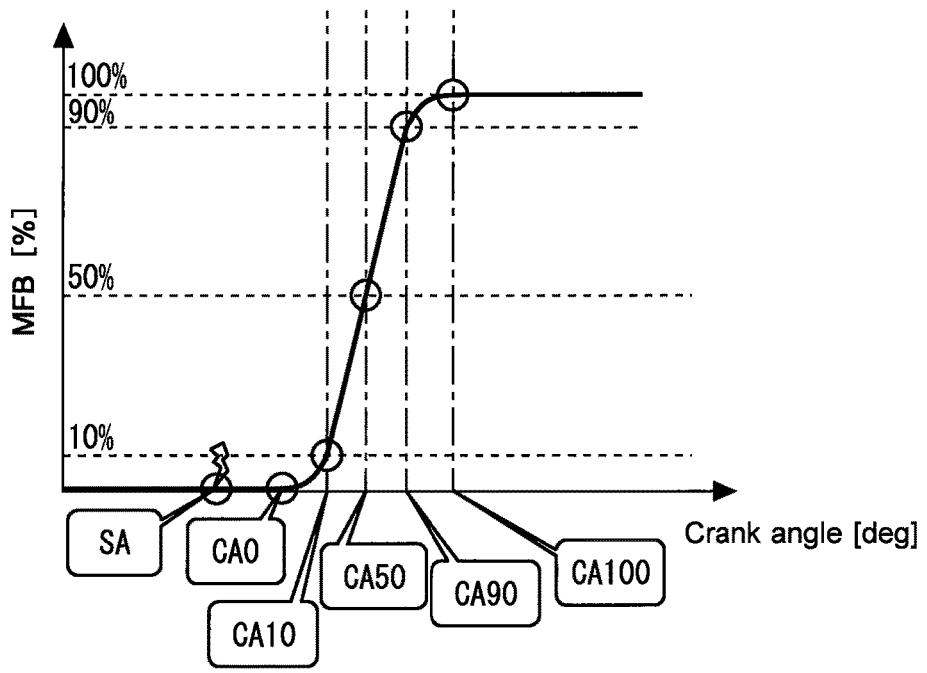
FIG. 2 is a graph that represents a spark timing (SA) and a waveform of a mass fraction of burned fuel.

FIG. 2 is a graph that represents a spark timing (SA) and a waveform of a mass fraction of burned fuel. According to the system of the present embodiment including the in-cylinder pressure sensor 58 and the crank angle sensor 52, in each cycle of the internal combustion engine 10, actual data of an in-cylinder pressure P that is synchronized with a crank angle (CA) (more specifically, a set of the in-cylinder pressures P calculated as values associated with the respective predetermined crank angles) can be obtained. By using the actual data of the in-cylinder pressure P that is obtained and the first law of thermodynamics, a heat release amount Q in a cylinder at an arbitrary crank angle θ can be calculated in accordance with expressions (1) and (2) as follows. Further, by using the actual data of the heat release amount Q calculated (a set of the heat release amounts Q calculated as values associated with the respective predetermined crank angles), the mass fraction of burned fuel (hereinafter, referred to as "MFB") at an arbitrary crank angle θ can be calculated in accordance with expression (3) as follows. Furthermore, actual data of MFB that is synchronized with the crank angle (a set of actual MFB) can be calculated by executing processing to calculate the MFB at each predetermined crank angle. The actual data of MFB is calculated for a combustion period and for predetermined crank angle periods before and after the combustion period (for example, a crank angle period from a closing timing IVC of the intake valve 26 to an opening timing EVO of the exhaust valve 28).

$$dQ/d\theta = \frac{1}{\kappa - 1} \times \left( V \times \frac{dP}{d\theta} + P \times \kappa \times \frac{dV}{d\theta} \right) \quad (1)$$

$$Q = \sum \frac{dQ}{d\theta} \quad (2)$$

$$MFB = \frac{Q(\theta) - Q(\theta_{min})}{Q(\theta_{max}) - Q(\theta_{min})} \times 100 \quad (3)$$

Where, in expression (1) described above, V represents an in-cylinder volume and κ represents a ratio of specific heat of in-cylinder gas. Further, in expression (3) described above, $\theta_{min}$ denotes a combustion start point, and $\theta_{max}$ denotes a combustion end point.

According to the actual data of MFB calculated by the above described method, a crank angle (CAX) at which MFB reaches an arbitrary fraction X% can be calculated. Next, with reference to FIG. 2, typical crank angles CAX will be described. Combustion in a cylinder starts with an ignition delay after an air-fuel mixture is ignited at the spark timing (SA). The start point of the combustion ($\theta_{min}$ in expression (3) described above), that is, a crank angle at which MFB starts to rise will be referred to as CA0. A crank angle period (CA0-CA10) from CA0 to a crank angle CA10 at which MFB reaches 10% generally corresponds to an initial combustion period, and a crank angle period (CA10-CA90) from CA10 to a crank angle CA90 at which MFB reaches 90% generally corresponds to a main combustion period. Further, a crank angle CA50 at which MFB reaches 50% is used as a combustion center. A crank angle CA100 at which MFB reaches 100% corresponds to a combustion end point ($\theta_{max}$ in expression (3) described above) at which the heat release amount Q reaches a maximum value. The combustion period is defined as a crank angle period from CA0 to CA100.

[Control at Time of Engine Starting]

In the present embodiment, control to promote activation of the exhaust gas purification catalyst 32 (hereinafter, also referred to as a "catalyst warm-up control") is performed immediately after a cold start of the internal combustion engine 10 by the ECU 50 illustrated in FIG. 1. Catalyst warm-up control that is executed by the ECU 50 will be described with reference to FIGS. 3 to 7.

Figure 3:
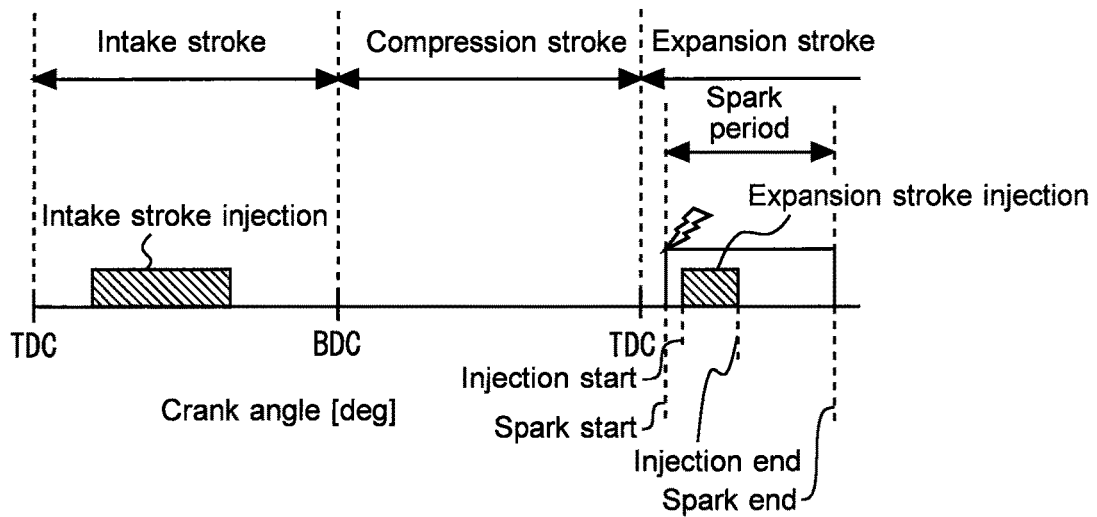
FIG. 3 is a diagram showing an example of injection periods an injector and a spark period (a discharge period at an electrode portion) for a spark plug under catalyst warm-up control.

FIG. 3 is a diagram showing an example of injection periods for the injector 40 and a spark period (a discharge period at the electrode portion 38) for the spark plug 36 under catalyst warm-up control. In addition, the spark period corresponds to a "predetermined period" in the present disclosure. As illustrated in FIG. 3, during the catalyst warm-up control, the first-time fuel injection (the first fuel injection) by the injector 40 is performed in an intake stroke, and the second-time fuel injection (the second fuel injection) with a smaller amount of fuel as compared with that in the first-time fuel injection is performed in an expansion stroke after the compression top dead center. In the following explanation, the first-time fuel injection (the first fuel injection) will be also referred to as an "intake stroke injection", and the second-time fuel injection (the second fuel injection) will be also referred to as an "expansion stroke injection". In the present embodiment, as an example, the amounts of the intake stroke injection and the expansion stroke injection are determined such that an air-fuel ratio according to the sum of the fuel amount of the intake stroke injection and the fuel amount of the expansion stroke injection becomes equal to the stoichiometric air-fuel ratio. Thus, an air-fuel ratio of the air-fuel mixture generated by the intake stroke injection becomes slightly leaner than the stoichiometric air-fuel ratio. The first fuel injection may be performed in the compression stroke in place of the intake stroke injection, or with the intake stroke injection. Further, the first fuel injection may be performed in a plurality of batches.

Further, as illustrated in FIG. 3, during the catalyst warm-up control, a start timing (a discharge start timing) of the spark period for the spark plug 36 is set on the retard side of the compression top dead center. In FIG. 3, although the expansion stroke injection is started on the retard side of the start timing of the spark period, the expansion stroke injection may be started on the advance side of the start timing of the spark period. More specifically, in order to achieve an attraction action described below, at least a part of the injection period of the expansion stroke injection needs to overlap the spark period (the "predetermined period" according to the present disclosure), and the end timing of the expansion stroke injection needs to be advanced from the end timing of the spark period. If this condition is satisfied, the expansion stroke injection (the second fuel injection) may be performed in a plurality of batches.

(Attraction Action by Expansion Stroke Injection)

Figure 4A:
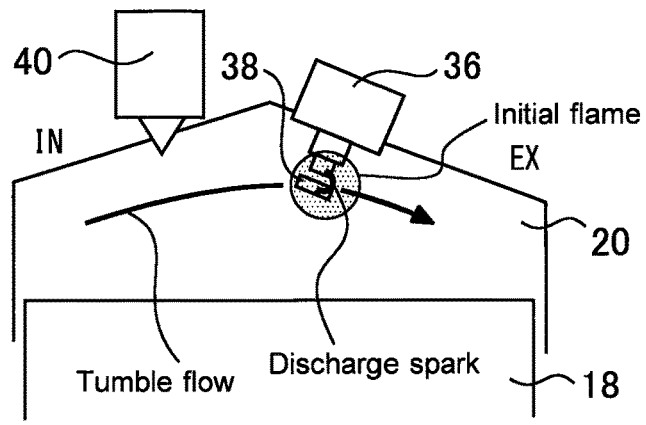
FIGS. 4A to 4C are views for explaining an attraction action of an initial flame by an expansion stroke injection.
Figure 4B:
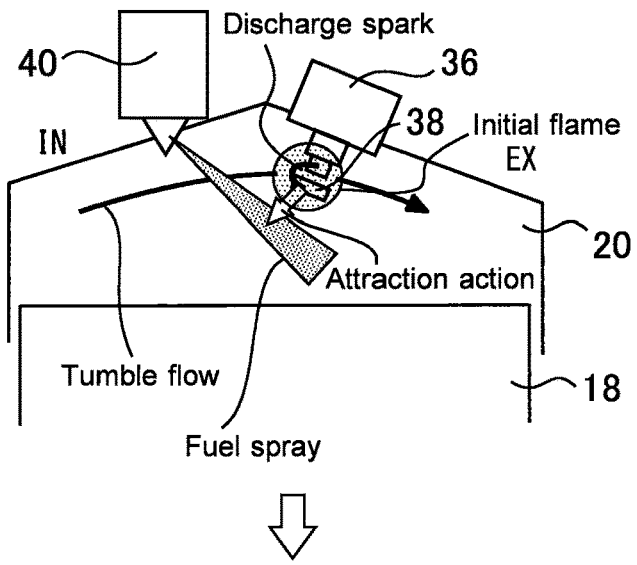
Figure 4C:
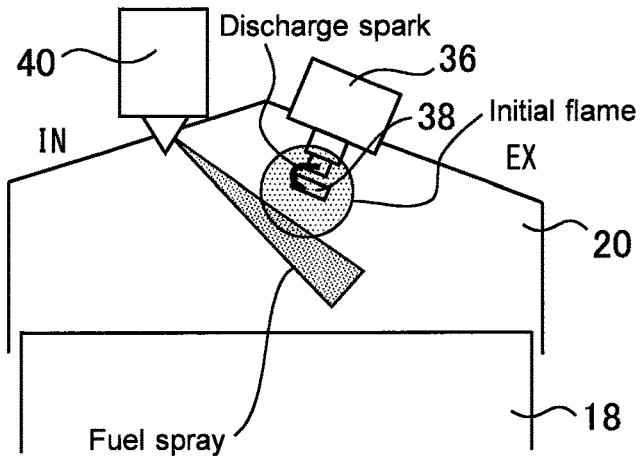

FIGS. 4A to 4C are views for explaining the attraction action of the initial flame by the expansion stroke injection. FIGS. 4A to 4C illustrate two different states of a discharge spark generated by the electrode portion 38 during the spark period of the spark plug 36 and the initial flame (flame kernel) generated as a result of the fuel spray injected by the intake stroke injection coming into contact with the discharge spark. In more detail, FIG. 4A illustrates an example in which the expansion stroke injection is not performed, and FIGS. 4B and 4C illustrates an example in which the expansion stroke injection is performed. For convenience of the description, FIGS. 4B and 4C illustrate only the fuel spray that is closest to the spark plug 36 among fuel sprays injected by the expansion stroke injection.

As illustrated in FIG. 4A, in the example in which the expansion stroke injection is not performed, the discharge spark and the initial flame that are generated around the electrode portion 38 extend in a direction of the tumble flow. On the other hand, if expansion stroke injection is performed as illustrated in FIG. 4B, a low-pressure portion is formed around the fuel spray. Thus, the initial flame generated by the discharge spark generated by the electrode portion 38 in the expansion stroke is attracted by the fuel spray which passes under the electrode portion 38 as illustrated in FIG. 4B. The fuel spray injected by the expansion stroke injection creates, in the combustion chamber 20, a region where an air-fuel ratio is slightly richer than the stoichiometric air-fuel ratio and the turbulence of the in-cylinder gas is strong. The initial flame attracted by the fuel spray reaches the region, whereby the initial flame grows immediately and combustion rapidly progresses. Consequently, as compared with the example in which the expansion stroke injection is not performed (FIG. 4A), the combustion speed of the air-fuel mixture is enhanced to stabilize combustion, and the combustion fluctuation between cycles that has an adverse effect on the drivability of the internal combustion engine 10 is reduced.

(Control of Interval between Spark Start and Injection End)

Figure 5:
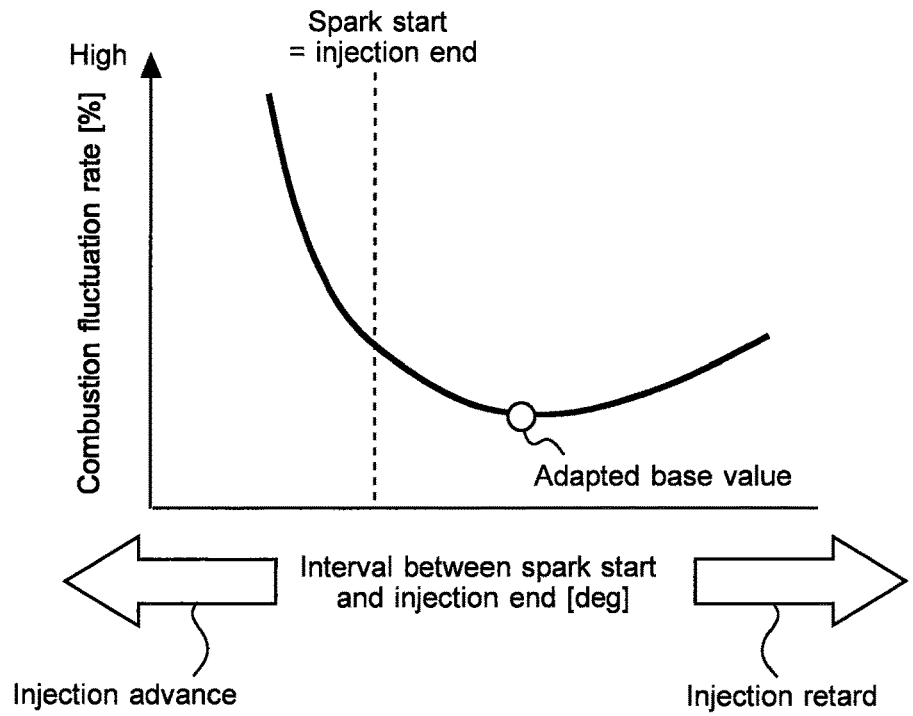
FIG. 5 is a diagram illustrating a relationship between an interval from the start of the spark period to the end of the expansion stroke injection (the interval between the spark start and the injection end), and a combustion fluctuation rate.

In the catalyst warm-up control, an interval from the start of the spark period by the spark plug 36 (that is, the spark timing) to the end of the expansion stroke injection is controlled by the ECU 50. FIG. 5 is a diagram illustrating a relationship between the interval from the start of the spark period to the end of the expansion stroke injection (the interval between the spark start and the injection end), and a combustion fluctuation rate. The relationship between the combustion fluctuation rate and the interval between the spark start and the injection end is obtained as a result of the start timing of the expansion stroke injection changing while the injection period (which corresponds to the injection amount) of the expansion stroke injection is fixed and the start timing and the end timing of the spark period are fixed. As illustrated in FIG. 5, the combustion fluctuation rate with respect to "the interval between the spark start and the injection end" is expressed by a curved line which is projected downward. Furthermore, as shown in FIG. 5, the combustion fluctuation rate is minimized at a value of the interval obtained when the start timing of the expansion stroke injection (the injection start) is retarded from a value which is the same as the start timing of the spark period (the spark start) (see "Spark start=Injection start" in FIG. 5).

Hereinafter, a value of "the interval between the spark start and the injection end" obtained when the combustion fluctuation rate is minimized as shown in FIG. 5 is also referred to as an "adapted base value"). The ROM of the ECU 50 stores a map of the adapted base value associated with the engine operating condition (hereinafter, also referred to as a "adapted base value map"). The adapted base value is read out from the map at the time of the catalyst warm-up control.

Figure 6:
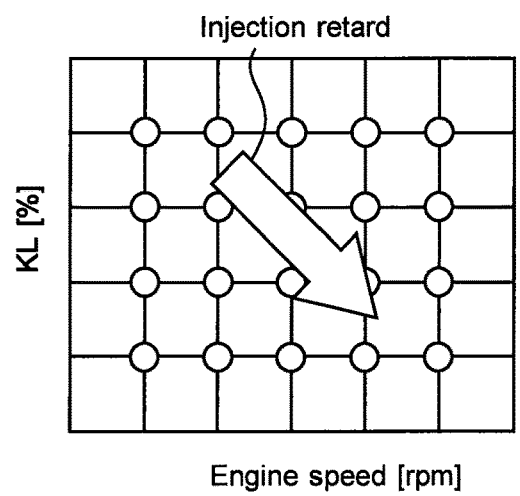
FIG. 6 is a diagram illustrating an example of an adapted base value map.

FIG. 6 is a diagram illustrating an example of the adapted base value map. As illustrated in FIG. 6, the adapted base value map is created as a two-dimensional map using the engine speed and an engine load KL as both axes. Since the adapted base value map is created for each of the engine cooling water temperature ranges divided at intervals of a predetermined temperature, there are a plurality of two-dimensional maps like this actually. Further, as illustrated by an arrow in FIG. 6, the adapted base value is set to be retarded when the engine speed is higher or the engine load KL is lower. The reason is because the growth of the initial flame is relatively slower when the engine speed is higher, and the growth of the initial flame is relatively faster, due to improvement of the in-cylinder environment, when the engine load KL is higher.

Figure 7:
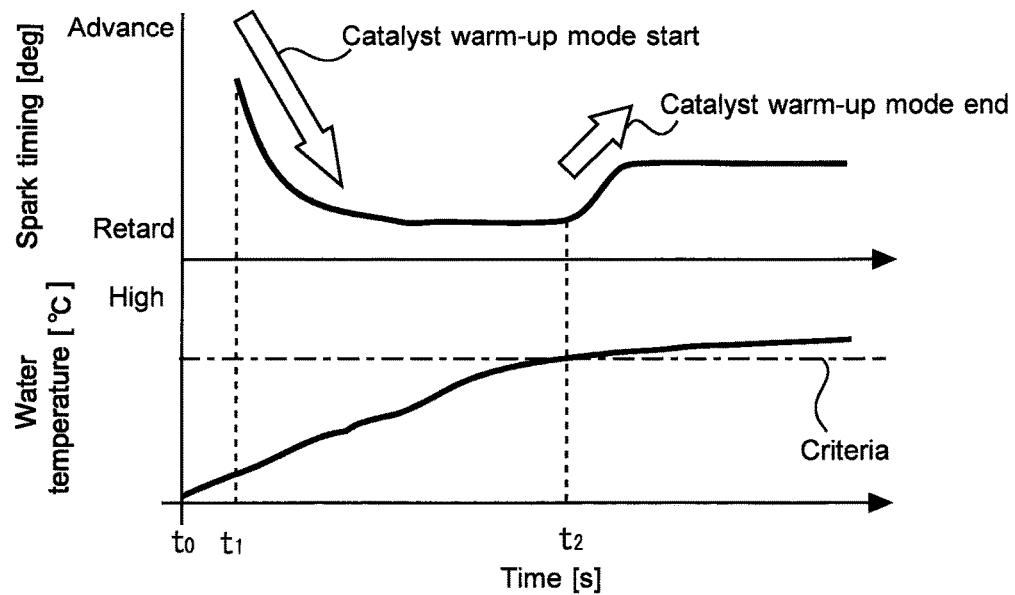
FIG. 7 is a graph illustrating transition of the spark timing of the spark plug (more precisely, the start timing of the spark period) and an engine cooling water temperature at the time of a cold start of an internal combustion engine.

In the catalyst warm-up control, specifically, the start timing of the spark period of the spark plug 36 and the end timing of the expansion stroke injection are determined as follows. First, the start timing of the spark period of the spark plug 36 is determined based on a basic spark timing and its retard correction amount. Then, the end timing of the expansion stroke injection is determined by adding, to the determined start timing of the spark period, the adapted base value that is obtained from the adapted base value map and the engine operating condition. FIG. 7 is a graph illustrating transition of the spark timing of the spark plug 36 (more precisely, the start timing of the spark period) and the engine cooling water temperature at the time of a cold start of the internal combustion engine 10. When the internal combustion engine 10 is started at a time point $t_0$ illustrated in FIG. 7, an operation mode performing the catalyst warm-up control (hereinafter, also referred to as a "catalyst warm-up mode") is started from a time point $t_1$ immediately after the time point $t_0$, and the spark timing is set so as to be gradually retarded. Then, at a time point $t_2$ at which the engine cooling water temperature reaches a criteria (50° C. as an example), a fast idling (FI) operation accompanied by the catalyst warm-up mode is ended, and thereafter, the spark timing is set so as to be gradually advanced.

The basic spark timing is stored in the RQM of the ECU 50 as a value corresponding to the engine operating condition (mainly an intake air amount and the engine speed). Further, the retard correction amount is determined based on a map (hereinafter, also referred to as a "retard correction amount map") in which the retard correction amount is associated with the engine cooling water temperature. The retard correction amount map is stored in the ROM of the ECU 50 similarly to the adapted base value map, and at the time of the catalyst warm-up control, the start timing of the spark period (the spark timing) is read out from the map.

[Control of Shape of Tumble Flow]

Figure 8A:
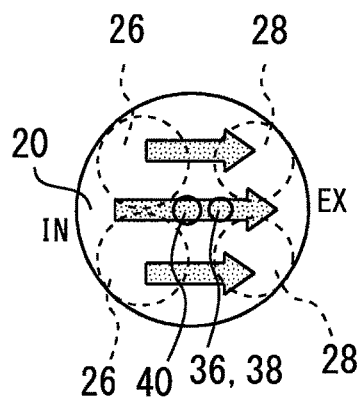
FIGS. 8A and 8B are views of a tumble flow in a combustion chamber seen from above.
Figure 8B:
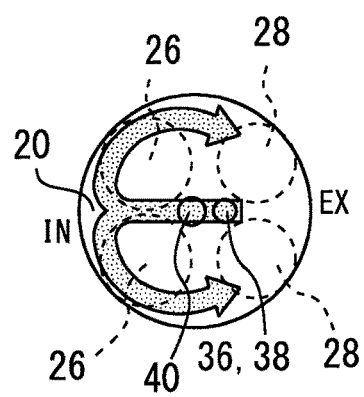

FIGS. 8A and 8B are views of the tumble flow in the combustion chamber 20 seen from above, and these views show shapes of the tumble flows that are generated at a timing in the vicinity of the compression top dead center in a position near the electrode portion 38 in the axial direction of the cylinder.

FIG. 8A corresponds to an example where a positive tumble flow is generated. Then, in this example, the in-cylinder gas goes from the intake valve 26 side toward the exhaust valve 28 side in the vicinity of the electrode portion 38. On the other hand, the tumble flow in a shape shown in FIG. 8B is opposite to the positive tumble flow, and the in-cylinder gas goes from the exhaust valve 28 side toward the intake valve 26 side in the vicinity of the electrode portion 38. The tumble flow seems to be in a ω shape seen from above the combustion chamber 20 as illustrated in FIG. 8B, and therefore, the shape will be also referred to as a "ω tumble shape", and the tumble flow in the ω tumble shape will be also simply referred to as a "ω tumble flow" hereinafter.

A generation mechanism of the ω tumble flow is described in detail in JP 2015-052290 A, for example, and therefore, an outline thereof will be described here. That is, as disclosed in this document, it is known that a specified tumble ratio range suitable for generation of the ω tumble flow is present. Accordingly, when the tumble ratio is within the above described tumble ratio range, the ω tumble flow is generated. In addition, the ω tumble flow is generated by going through the following process as disclosed in the document described above. That is, when the tumble ratio is within the tumble ratio range described above, a tumble flow which should originally be one rigid vortex as the positive tumble flow in the cylinder changes to be tumble flows having two center axes (in other words, a tumble flow having two swirl flow (lateral vortex flow) components whose rotational directions are opposite to each other when the combustion chamber 20 is seen from above) due to bending of a tumble center axis in a process of the in-cylinder gas being compressed in the compression stroke. As a result, as illustrated in FIG. 8B, a flow in the w shape is generated in the vicinity of the compression top dead center when the combustion chamber 20 is seen from above. Furthermore, the ω tumble flow remains up to the timings of spark and fuel injection in the expansion stroke used in the catalyst warm-up control according to the present embodiment.

On the other hand, if the tumble ratio is out of the above described tumble ratio range, a degree of bending of the tumble center axis becomes lower than that in the example where the ω tumble flow is generated, and therefore, the positive tumble flow is kept at the timing in the vicinity of the compression top dead center as illustrated in FIG. 8A. Further, the positive tumble flow in this example remains up to the timing of spark and fuel injection in the expansion stroke used in the catalyst warm-up control according to the present embodiment, similarly to the example where the tumble flow is changed to the ω tumble flow.

[Influence of Difference in Tumble Flow Shape on Attraction Action]

Figure 9:
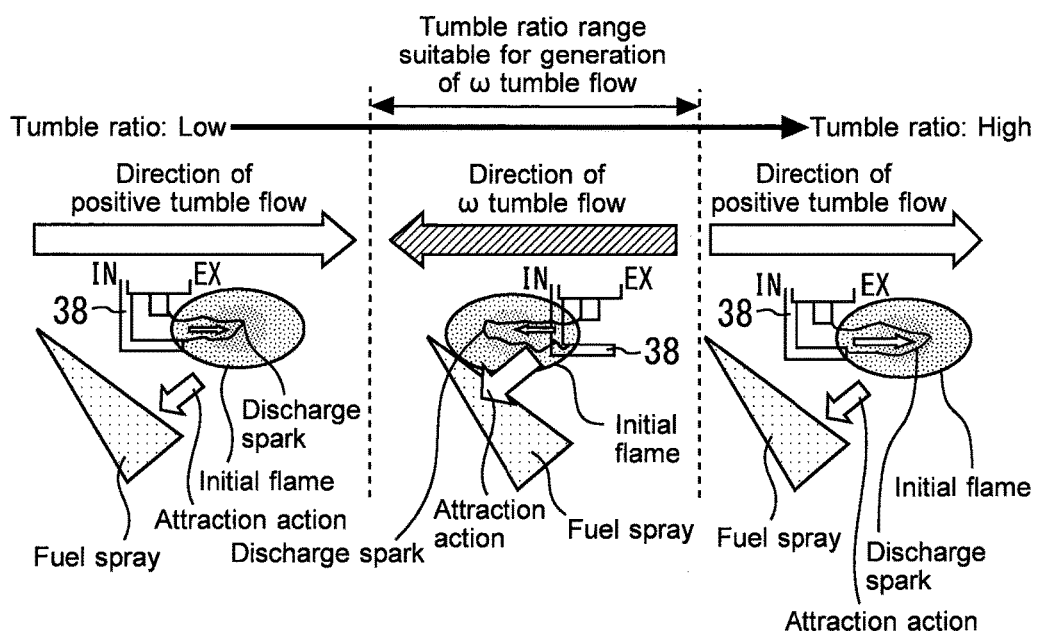
FIG. 9 is a diagram for explaining an influence of a difference in tumble flow shape on the attraction action that affects the initial flame by the expansion stroke injection.

FIG. 9 is a diagram for explaining an influence of a difference in tumble flow shape on the attraction action that affects the initial flame by the expansion stroke injection.

First, as illustrated in the left part of FIG. 9, in an example where the tumble ratio is lower than the tumble ratio range suitable for generation of the ω tumble flow, the discharge spark in the vicinity of the electrode portion 38 is caused to flow to the side of the exhaust valve 28 from the side of the intake valve 26 by the positive tumble flow, and with this, the initial flame is also caused to flow to the similar direction. That is, in this example, the initial flame is affected by the attraction action after being caused to flow so as to be away from the fuel spray of the expansion stroke injection. Thus, the initial flame is difficult to be attracted by the fuel spray. As a result, the initial combustion period (see FIG. 2) becomes longer. This similarly applies to an example illustrated in the right part of FIG. 9, that is, an example in which the tumble ratio is higher than the above described tumble ratio range.

On the other hand, the middle part of FIG. 9 illustrates an attraction action obtained when the tumble ratio falls within the above described tumble ratio range. In this example, the discharge spark in the vicinity of the electrode portion 38 is caused to flow to the side of the intake valve 26 from the side of the exhaust valve 28 by the ω tumble flow, and with this, the initial flame is also caused to flow to the similar direction. That is, in this example, the initial flame is affected by the attraction action after the initial flame is caused to flow so as to approach the fuel spray of the expansion stroke injection, and therefore the initial flame is easily attracted by the fuel spray. Further, a time period from generation of initial flame (flame kernel formation) until the initial flame reaches the fuel spray can be reduced. As a result, the initial combustion speed becomes higher (in other words, the initial combustion period becomes shorter).

[Tumble Control during Catalyst Warm-up Control]

From the knowledge described with reference to FIG. 9, it can be said that if the actual tumble ratio is controlled such that the ω tumble flow is obtained during execution of the catalyst warm-up control, the combustion stability can be enhanced due to the use of the ω tumble flow. However, the aforementioned tumble ratio range suitable for generation of the ω tumble flow is narrow, and the actual tumble ratio may vary due to a factor such as a manufacturing error or aged deterioration of the internal combustion engine 10. Accordingly, in order to enhance the combustion stability during execution of the catalyst warm-up control, it is requested to enable the ω tumble flow to be used stably.

In regard to the above described request, if it can be determined during execution of the catalyst warm-up control whether or not the actual tumble ratio is within the tumble ratio range suitable for generation of the ω tumble flow, the ω tumble flow can be stably used by controlling the actual tumble ratio based on the determination result. As already described with reference to FIG. 9, in the example in which the ω tumble flow is generated (the middle of FIG. 9), the speed of the initial combustion becomes higher (the initial combustion period becomes shorter) as compared with the examples in which the ω tumble flow is not generated (the left part and the right part of FIG. 9).

Thus, in the present embodiment, a first index value representing the initial combustion speed is calculated based on an output value of the in-cylinder pressure sensor 58, and based on the magnitude of the first index value, it is determined whether or not the ω tumble flow is generated (in other words, whether or not the actual tumble ratio is within the tumble ratio range suitable for generation of the ω tumble flow). In the present embodiment, as one example of the first index value like this, a crank angle period from the spark timing (SA) to the 10% combustion point CA10 (hereinafter, also referred to as "SA-CA10") is used.

However, by only determining whether or not SA-CA10 that is correlated with the initial combustion speed is smaller than or equal to a threshold value TH1 used for the aforementioned determination, it cannot be determined, when SA-CA10 is greater than the threshold value TH1 (that is, when the initial combustion speed is low), whether the tumble ratio is lower (the left part of FIG. 9) or higher (the right part of FIG. 9) than the above described tumble ratio range. When the tumble ratio is higher, the main combustion speed is higher (in other words, the main combustion period is shorter) as compared with when the tumble ratio is lower. Accordingly, by using the main combustion speed as well as the initial combustion speed based on SA-CA10, it can be determined whether the tumble ratio is insufficient (the left part of FIG. 9) or excessive (the right part of FIG. 9) as compared with the tumble ratio range described above. In the present embodiment, as an example of a second index value representing the main combustion speed, a crank angle period (hereinafter, also referred to as "CA10-50") from the 10% combustion point CA10 to the 50% combustion point (the combustion center) CA50 is used.

More specifically, in the present embodiment, if SA-CA10 is greater than the threshold value TH1 during execution of the aforementioned catalyst warm-up control, it is determined whether or not CA10-50 is a threshold value TH2 or less. As a result, if CA10-50 is the threshold value TH2 or less, the actual tumble ratio is increased by increasing the flow velocity of the tumble flow, whereas if CA10-50 is greater than the threshold value TH2, the flow velocity of the tumble flow is reduced to decrease the actual tumble ratio.

Figure 10:
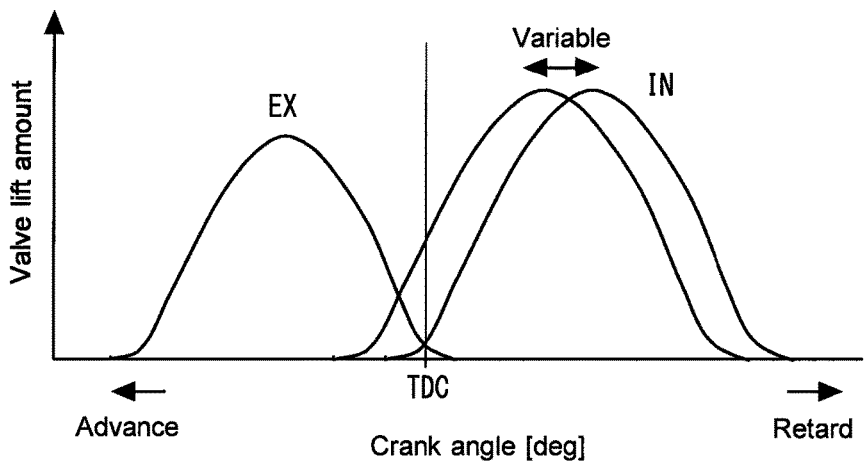
FIG. 10 is a graph for explaining an adjustment method of an actual tumble ratio by adjustment of an opening timing IVO of an intake valve.

FIG. 10 is a graph for explaining an adjustment method of the actual tumble ratio by adjustment of an opening timing IVO of the intake valve 26. FIG. 10 shows valve timings of the intake valve 26 and the exhaust valve 28 that are used during execution of the aforementioned catalyst warm-up control. According to the aforementioned variable intake valve apparatus 34, the opening timing IVO of the intake valve 26 can be changed. When the opening timing IVO is retarded to approach the intake top dead center in an example in which the opening timing IVO of the intake valve 26 is set on the advance side of the intake top dead center (TDC) as illustrated in FIG. 10, the intake air amount is decreased and the flow velocity of the tumble flow is thus decreased. Thereby, the actual tumble ratio can be reduced. Consequently, by advancing or retarding the opening timing IVO on the advance side of the compression top dead center as illustrated in FIG. 10, the actual tumble ratio can be increased and decreased.

Thus, in the present embodiment, when the actual tumble ratio needs to be increased as a result of the aforementioned determination using SA-CA10 and CA10-50, the opening timing IVO is advanced by a predetermined amount by using the variable intake valve apparatus 34, whereas when the actual tumble ratio needs to be decreased, the opening timing IVO is retarded by a predetermined amount.

Specific Processing According to First Embodiment

Figure 11:
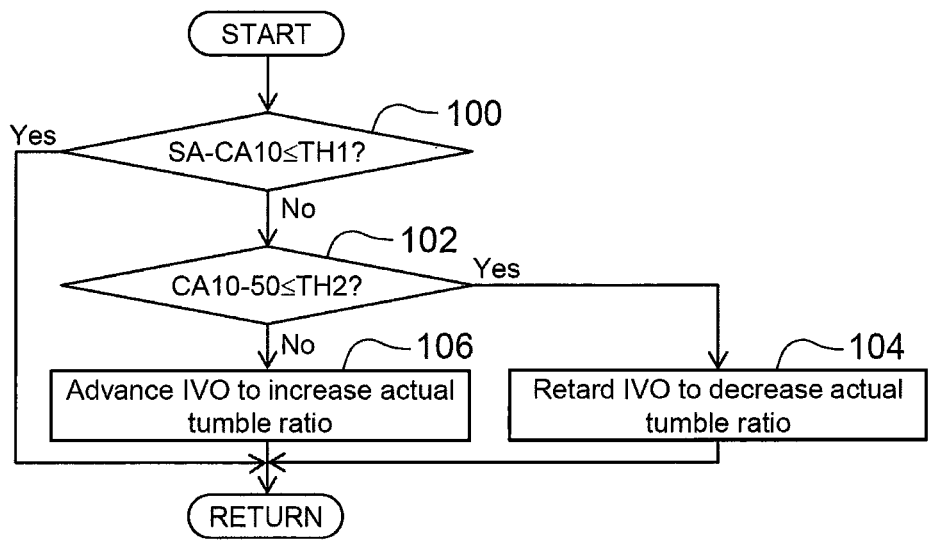
FIG. 11 is a flowchart illustrating an example of processing that is executed by an ECU according to the first embodiment of the present disclosure.

FIG. 11 is a flowchart illustrating an example of processing that is executed by the ECU 50 according to the first embodiment of the present disclosure. The routine illustrated in FIG. 11 is repeatedly executed during execution of the aforementioned catalyst warm-up control.

In the routine illustrated in FIG. 11, first, the ECU 50 determines whether or not SA-CA10 is the threshold value TH1 or less (step 100). SA-CA10 that is used in this step 100 is calculated by using CA10 and the spark timing (the start timing of the spark period). CA10 used here is calculated based on the output value of the in-cylinder pressure sensor 58 that is provided in a predetermined representative cylinder. The start timing (the spark timing (SA)) of the spark period during execution of the catalyst warm-up control is determined as a value corresponding to the engine cooling water temperature as already described. Further, the threshold value TH1 is set in advance as a value corresponding to the maximum value of SA-CA10 which is obtained when the ω tumble flow is generated during execution of the catalyst warm-up control.

If the result of the determination in step 100 is positive (SA-CA10≥TH1), that is, if the SA-CA10 shows that the initial combustion speed is a first threshold value or more, it can be determined that, since the calculated SA-CA10 is smaller than or equal to a value corresponding to the aforementioned maximum value, the ω tumble flow is generated and, as a result, the air flow going toward the side of the intake valve 26 is generated around the electrode portion 38 at a sufficient flow velocity at a timing at which the attraction action is achieved (refer to the middle part of FIG. 9). Thus, the ECU 50 promptly ends the processing of the routine.

If the result of the determination in step 100 is negative (SA-CA10>TH1), that is, if the SA-CA10 shows that the initial combustion speed is lower than the first threshold value, it can be determined that the ω tumble flow is not generated at the timing at which the attraction action is achieved. Then, the ECU 50 determines whether or not CA10-50 is the threshold value TH2 or less (step 102). CA10-50 that is used in this step 102 is also the value based on the output value of the in-cylinder pressure sensor 58 provided in the above described representative cylinder as in step 100. Further, the threshold value TH2 is set in advance as a value with which it can be determined whether the actual tumble ratio of the representative cylinder is higher than an upper limit of the tumble ratio range suitable for generation of the ω tumble flow or is lower than a lower limit of the tumble ratio range.

If the result of the determination in step 102 is positive (CA10-50≤TH2), that is, if the CA10-50 shows that the main combustion speed is the second threshold value or more, it can be determined that the actual tumble ratio is higher than the upper limit of the above described tumble ratio range. Accordingly, the ECU 50 controls the variable intake valve apparatus 34 such that the opening timing IVO of the intake valve 26 is retard by a predetermined amount in order to decrease the actual tumble ratio (step 104). That is, in the first embodiment, the tumble ratio decrease control is performed in the manner like this.

On the other hand, if the result of the determination in step 102 is negative (CA10-50>TH2), that is, if the CA10-50 shows that the main combustion speed is lower than the second threshold value, it can be determined that the actual tumble ratio is lower than the lower limit of the above described tumble ratio range. Accordingly, the ECU 50 controls the variable intake valve apparatus 34 such that the opening timing IVO of the intake valve 26 is advanced by a predetermined amount in order to increase the actual tumble ratio (step 106). That is, in the first embodiment, the tumble ratio increase control is performed in the manner like this.

According to the processing of the routine illustrated in FIG. 11 described above, even when the ω tumble flow is not generated at the start of the catalyst warm-up control, the processing of the present routine is repeatedly executed, whereby the actual tumble ratio can be controlled to be within the tumble ratio range suitable for generation of the ω tumble flow. Thereby, the ω tumble flow can be stably used at the time of execution of the catalyst warm-up control with the aforementioned attraction action, and as a result, the combustion stability can be stably improved.

Further, in the present embodiment, as an example of the first index value that represents the speed of the initial combustion accompanying the ignition in the expansion stroke, SA-CA10 is used. The combustion start point CA0 that is calculated by using the in-cylinder pressure sensor 58 is likely to include an error due to the influence of noise that is superimposed on the output value of the in-cylinder pressure sensor 58. Therefore, by using the spark timing (SA) as the start timing of the crank angle period that corresponds to the first index value, this start timing can be properly determined at the timing near the combustion start point CA0 while the influence of noise is avoided. Further, the influence of the noise becomes smaller when the combustion is away from the combustion start point CA0. Therefore, by using the 10% combustion point CA10 as the end timing of the crank angle period that corresponds to the first index value, this end timing can be properly determined while the influence of noise is made as small as possible.

Further, in the present embodiment, CA10-50 is used as one example of the second index value that represents the speed of the main combustion accompanying the ignition in the expansion stroke. The combustion end point CA100 that is calculated based on the output of the in-cylinder pressure sensor 58 is likely to include an error due to the influence of the above described noise, similarly to the combustion start point CA0. The influence of the noise becomes the smallest in the vicinity of the 50% combustion point CA50 which is away from both of the combustion start point CA0 and the combustion end point CA100. Therefore, the end timing of the crank angle period that is used as the second index value is set at the 50% combustion point CA50, whereby the crank angle period representing the main combustion speed can be properly set while the influence of noise is favorably decreased.

Figure 12:
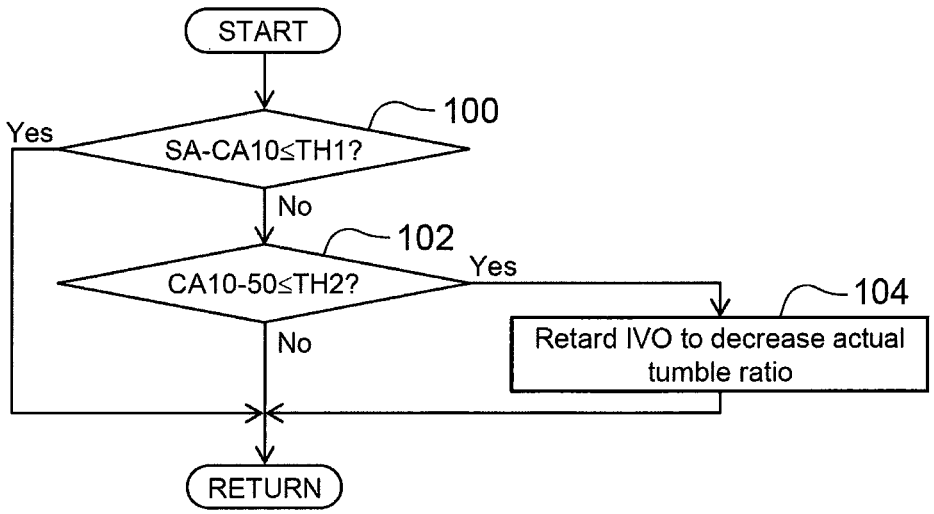
FIG. 12 is a flowchart illustrating an example of processing that is executed by an ECU according to a modification of the first embodiment of the present disclosure.
Figure 13:
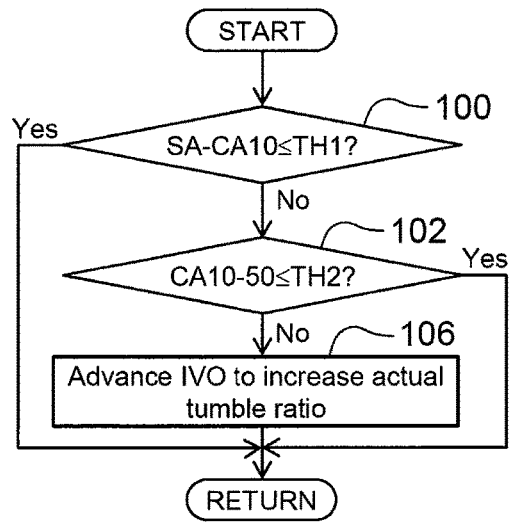
FIG. 13 is a flowchart illustrating an example of processing that is executed by an ECU according to another modification of the first embodiment of the present disclosure.

In the first embodiment described above, if SA-CA10 is greater than the threshold value TH1, the tumble ratio decrease control or the tumble ratio increase control is performed in accordance with the determination result of CA10-50. However, where SA-CA10 is greater than the threshold value TH1, even if only either one of tumble ratio decrease control and the tumble ratio increase control is performed, the ω tumble flow can be said to be generated more stably as compared with an example where none of the controls is performed. Thus, in place of the processing of the routine illustrated in FIG. 11 described above, only the tumble ratio decrease control may be performed as in the routine illustrated in FIG. 12, or only the tumble ratio increase control may be performed as in the routine illustrated in FIG. 13.

Further, in the first embodiment described above, the variable intake valve apparatus 34 is controlled in accordance with the result of determination using SA-CA10 and CA10-50 based on the output value of the in-cylinder pressure sensor 58 installed in the predetermined representative cylinder. According to the variable intake valve apparatus 34 having the configuration already described, the opening timings IVO of the intake valves 26 in all the cylinders are changed collectively. However, where the internal combustion engine 10 includes the variable intake valve apparatus that can change the opening timing IVO independently for each of the cylinders, the opening timing IVO may be controlled independently for each of the cylinders in accordance with the result of the determination using SA-CA10 and the like based on the output value of the in-cylinder pressure sensor 58 provided at each of the cylinders, in place of the above described example.

Further, in the first embodiment described above, the example of using the VVT device that can change the opening and closing timings of the intake valve 26 while fixing the valve opening period of the intake valve 26 is used. However, the change of the valve opening characteristics of the intake valve 26 for the control of the actual tumble ratio may be performed by changing at least the opening timing IVO. Accordingly, only the opening timing IVO may be changed to control the actual tumble ratio by using a variable intake valve apparatus having a known variable device that can change the opening timing IVO independently from the closing timing IVC.

Second Embodiment

Next, with reference to FIG. 14, a second embodiment of the present disclosure will be described. In the following explanation, as an example of a system configuration of the second embodiment, the configuration illustrated in FIG. 1 is assumed to be used. This similarly applies to a third embodiment that will be described later.

In the aforementioned first embodiment, if SA-CA10 is greater than the threshold value TH1, the actual tumble ratio is increased and decreased by changing the opening timing IVO of the intake valve 26. In contrast with this, in the present embodiment, if SA-CA10 is greater than the threshold value TH1, the intake stroke injection timing is controlled in accordance with the result of determining the magnitude of CA10-50, whereby the flow velocity of the tumble flow is increased or decreased, and with this, the actual tumble ratio is increased or decreased.

The injector 40 which the internal combustion engine 10 includes injects fuel radially into the cylinder by means of a plurality of injection holes as already described. In the fuel sprays that are injected radially like this, fuel sprays that go in the same direction as the direction of the positive tumble flow generated from the air flow that is introduced into the cylinder are present, and fuel sprays that are to go in an opposite direction from the direction of the positive tumble flow are also present.

If the intake stroke injection timing (more specifically, the start timing of intake stroke injection) is advanced, an effect of increasing the flow velocity of the tumble flow by the fuel spray injected in the same direction as the positive tumble flow is easily obtained. Further, the fuel sprays injected in a direction opposite to the tumble flow inhibit rotation of the tumble flow. However, if the intake stroke injection timing is advanced, the tumble flow becomes stronger, and therefore, the rotation of the tumble flow is difficult to be inhibited by the fuel spray.

On the other hand, if the intake stroke injection timing is retarded, the fuel sprays injected in the same direction as the positive tumble flow goes in such a manner as to accompany the tumble flow along a route of rotation of the tumble flow in the cylinder. As a result, the effect of increasing the flow velocity of the tumble flow by the fuel sprays is difficult to be obtained. Further, if the intake stroke injection timing is retarded, the tumble flow becomes relatively weaker, and therefore, the rotation of the tumble flow is easily inhibited by the fuel sprays injected in a direction opposite to the tumble flow.

As above, if the intake stroke injection timing is retarded, the flow velocity of the tumble flow is decreased and the actual tumble ratio can be decreased, whereas if the intake stroke injection timing is advanced, the flow velocity of the tumble flow is increased and the actual tumble ratio can be increased. Thus, in the present embodiment, where SA-CA10 is greater than the threshold value TH1 during execution of the aforementioned catalyst warm-up control, if CA10-50 is the threshold value TH2 or less, the intake stroke injection timing is retarded, whereas if CA10-50 is greater than the threshold value TH2, the intake stroke injection timing is advanced.

Specific Processing According to Second Embodiment

Figure 14:
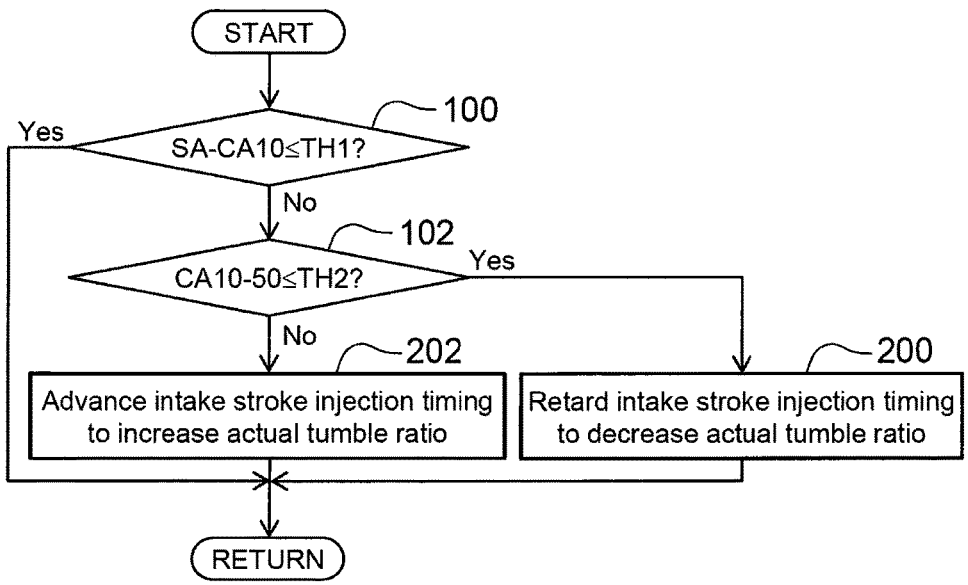
FIG. 14 is a flowchart illustrating an example of processing executed by the ECU according to the second embodiment of the present disclosure.

FIG. 14 is a flowchart illustrating an example of processing executed by the ECU 50 according to the second embodiment of the present disclosure. The processing in steps 100 and 102 in a routine illustrated in FIG. 14 is as already described in the first embodiment. In addition, the intake stroke injection timing can be changed independently for each of the cylinders. Thus, the intake stroke injection timing may be changed independently for each of the cylinders in accordance with the determination result of SA-CA10 and the like acquired for each of the cylinders, or the intake stroke injection timings of the plurality of cylinders may be collectively changed in accordance with the determination result of SA-CA10 and the like acquired in a predetermined representative cylinder, as in the first embodiment.

In the present routine, if the result of the determination in step 102 is positive (CA10-50≤TH2), the ECU 50 controls the injector 40 such that the intake stroke injection timing (the start timing of the injection) is retarded by a predetermined amount in order to decrease the actual tumble ratio (step 200). That is, in the second embodiment, the tumble ratio decrease control is performed in the manner like this.

On the other hand, if the result of the determination in step 102 is negative (CA10-50>TH2), the ECU 50 controls the injector 40 such that the intake stroke injection timing is advanced by a predetermined amount in order to increase the actual tumble ratio (step 202). That is, in the second embodiment, the tumble ratio increase control is performed in the manner like this.

With the processing of the routine illustrated in FIG. 14 described above, the w tumble flow can also be stably used at the time of execution of catalyst warm-up control with the aforementioned attraction action. The processing of the present routine may be modified such that only either one of the tumble ratio decrease control and the tumble ratio increase control is performed similarly to a relationship of the routines illustrated in FIGS. 12 and 13 to the routine illustrated in FIG. 11 of the first embodiment. This similarly applies to FIG. 15 of the third embodiment that will be described below.

Third Embodiment

Next, with reference to FIG. 15, a third embodiment of the present disclosure will be described.

The present embodiment differs from the first embodiment in a feature of performing control of the opening degree of the TCV 42 in place of the control of the opening timing IVO of the intake valve 26 when SA-CA10 is greater than the threshold value TH1. More specifically, the actual tumble ratio can be decreased by increasing the TCV opening degree (by controlling the TCV 42 to the opening side) to reduce the flow velocity of the tumble flow, whereas the actual tumble ratio can be increased by decreasing the TCV opening degree (by controlling the TCV 42 to the closing side) and to increase the flow velocity of the tumble flow. Accordingly, in the present embodiment, if SA-CA10 is greater than the threshold value TH1, the actual tumble ratio can be increased or decreased by controlling the TCV opening degree in accordance with the determination result of the magnitude of CA10-50.

Specific Processing According to Third Embodiment

Figure 15:
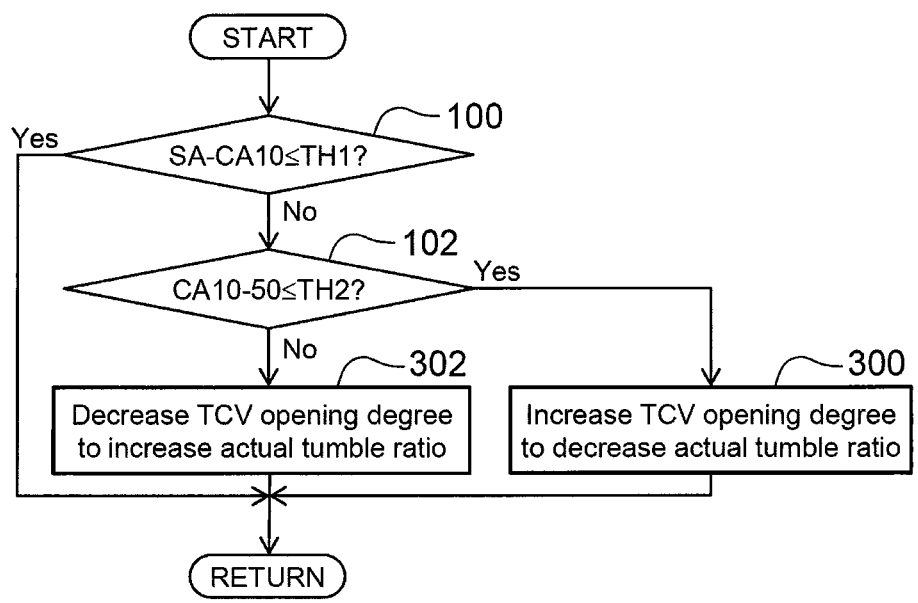
FIG. 15 is a flowchart illustrating an example of processing executed by the ECU according to the third embodiment of the present disclosure.

FIG. 15 is a flowchart illustrating an example of processing executed by the ECU 50 according to the third embodiment of the present disclosure. The processing in steps 100 and 102 in a routine illustrated in FIG. 15 is as already described in the first embodiment. In addition to the above, in an example of a configuration that can control the TCV opening degree independently for each of the cylinders, the TCV opening degree may be changed independently for each of the cylinders in accordance with the determination result of SA-CA10 and the like acquired for each of the cylinders. Further, in an example of a configuration in which TCV opening degrees of the plurality of cylinders are collectively controlled, the TCV opening degrees of a plurality of cylinders may be collectively changed in accordance with the determination result of SA-CA10 and the like acquired in a predetermined representative cylinder.

In the present routine, if the result of the determination in step 102 is positive (CA10-50≤TH2), the ECU 50 controls the TCV 42 such that the TCV opening degree is increased by a predetermined amount in order to decrease the actual tumble ratio (step 300). That is, in the third embodiment, the tumble ratio decrease control is performed in the manner like this.

On the other hand, if the result of the determination in step 102 is negative (CA10-50>TH2), the ECU 50 controls the TCV 42 such that the TCV opening degree is decreased by a predetermined amount in order to increase the actual tumble ratio (step 302). That is, in the third embodiment, the tumble ratio increase control is performed in the manner like this.

With the routine illustrated in FIG. 15 described above, the ω tumble flow can be stably used at the time of execution of the catalyst warm-up control with the aforementioned attraction action.

In the first to third embodiments described above, SA-CA10 is used as an example of the "first index value" representing the initial combustion speed, and CA10-50 is used as an example of the "second index value" representing the main combustion speed. Where a the combustion mode accompanied by the aforementioned attraction action is used, the period from a time point at which the initial flame is generated (a time point at which the flame kernel is formed) as a result of an ignition of the air-fuel mixture by the intake stroke injection (the first fuel injection) until the initial flame starts to contact with a fuel spray by the expansion stroke injection (the second fuel injection) with the attraction action is present within an extremely initial combustion period starting from the combustion start point CA0. Therefore, the first index value is not limited to the aforementioned SA-CA10, and may be the entire or a part of a crank angle period up to a specified ratio combustion point that is a crank angle at which MFB reaches a specified ratio that is less than 50% from the start timing of the spark period (the spark timing (SA)) in the expansion stroke, as far as the crank angle period includes this kind of extremely initial combustion period. Accordingly, the first index value does not necessarily have to be started at the spark timing (SA), and may be a crank angle period from the combustion start point CA0 to the 10% combustion point CA10, for example. Further, the second index value is not limited to CA10-50, and may be the entire or a part of a crank angle period from the 10% combustion point CA10 to the combustion end point CA100, for example. Alternatively, the second index value may, for example, be a maximum value of a heat release rate $dQ/d\theta$ or a heat release rate $dQ/d\theta$ at a certain combustion point (the 50% combustion point CA50, for example).

What is claimed is:

1. A control device for an internal combustion engine that includes:
    an ignition device arranged in a vicinity of a center of an upper part of a combustion chamber, and includes a spark plug for igniting an air-fuel mixture in a cylinder using a discharge spark;
    an injector arranged nearer to an intake valve than the spark plug in the vicinity of the center of the upper part of the combustion chamber, and includes one or more injection holes provided such that a contour surface of a fuel spray injected from the one or more injection holes toward the spark plug passes under an electrode portion of the spark plug;
    an in-cylinder pressure sensor configured to detect in-cylinder pressure; and
    an exhaust gas purification catalyst configured to purify exhaust gas from the combustion chamber,
    wherein a tumble flow that flows so as to go toward a side of an exhaust valve from a side of the intake valve in the upper part of the combustion chamber is generated in the combustion chamber of the internal combustion engine,
    wherein the control device comprises:
    a tumble flow control section programmed to control a predetermined actuator such that a flow velocity of the tumble flow changes;
    a combustion control section programmed, in order to activate the exhaust gas purification catalyst, to control the injector so as to perform first fuel injection at a timing advanced from a compression top dead center, control the ignition device so as to generate the discharge spark in a predetermined period that is located in an expansion stroke, and control the injector so as to perform second fuel injection at a timing retarded from the compression top dead center, the second fuel injection being performed such that an injection period overlaps with at least a part of the predetermined period and an end timing of the injection period is advanced from an end timing of the predetermined period; and
    a parameter calculation section programmed, based on output values of the in-cylinder pressure sensor, to calculate a first index value representing a speed of initial combustion accompanying an ignition by the ignition device controlled by the combustion control section and a second index value representing a speed of main combustion accompanying the ignition, and
    wherein the tumble flow control section is programmed to execute at least one of a tumble ratio decrease control and a tumble ratio increase control, the tumble ratio decrease control decreasing an actual tumble ratio by decreasing the flow velocity of the tumble flow when the first index value indicates that the speed of the initial combustion is lower than a first threshold value and the second index value indicates that the speed of the main combustion is a second threshold value or more, the tumble ratio increase control increasing the actual tumble ratio by increasing the flow velocity of the tumble flow when the first index value indicates that the speed of the initial combustion is lower than the first threshold value and the second index value indicates that the speed of the main combustion is lower than the second threshold value.

2. The control device according to claim 1, wherein the first index value is a crank angle period from a start timing of the predetermined period to a specified fraction combustion point that is a crank angle at which a mass fraction of burned fuel based on an output value of the in-cylinder pressure sensor reaches a specified fraction that is less than 50%.

3. The control device according to claim 2, wherein the specified fraction combustion point is a 10% combustion point that is a crank angle at which the mass fraction of burned fuel based on an output value of the in-cylinder pressure sensor reaches 10%.

4. The control device according to claim 1, wherein the second index value is a crank angle period from a 10% combustion point to a 50% combustion point, the 10% combustion point being a crank angle at which a mass fraction of burned fuel based on an output value of the in-cylinder pressure sensor reaches 10%, the 50% combustion point being a crank angle at which the mass fraction of burned fuel based on an output value of the in-cylinder sensor reaches 50%.

* * * * *